United States Patent
Chung

(10) Patent No.: US 10,142,585 B2
(45) Date of Patent: Nov. 27, 2018

(54) METHODS AND SYSTEMS FOR SYNCHING SUPPLEMENTAL AUDIO CONTENT TO VIDEO CONTENT

(71) Applicant: Rovi Guides, Inc., Santa Clara, CA (US)

(72) Inventor: David D. Chung, Walnut Creek, CA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 14/697,830

(22) Filed: Apr. 28, 2015

(65) Prior Publication Data
US 2016/0323482 A1   Nov. 3, 2016

(51) Int. Cl.
| | |
|---|---|
| H04N 9/475 | (2006.01) |
| H04N 5/926 | (2006.01) |
| H04N 21/43 | (2011.01) |
| H04N 21/433 | (2011.01) |
| H04N 21/442 | (2011.01) |
| H04N 21/81 | (2011.01) |
| H04N 9/82 | (2006.01) |

(52) U.S. Cl.
CPC ......... *H04N 5/9265* (2013.01); *H04N 9/8211* (2013.01); *H04N 21/4307* (2013.01); *H04N 21/4333* (2013.01); *H04N 21/44204* (2013.01); *H04N 21/44222* (2013.01); *H04N 21/8106* (2013.01)

(58) Field of Classification Search
CPC ............ H04N 5/9265; H04N 9/8211; H04N 21/8106; H04N 21/44222; H04N 21/4333; H04N 21/4307; H04N 21/44204
See application file for complete search history.

(56) References Cited

U.S. PATENT DOCUMENTS

| | | | |
|---|---|---|---|
| 5,642,171 A * | 6/1997 | Baumgartner | G11B 27/10 348/515 |
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,054,544 B1 * | 5/2006 | Tanaka | H04N 9/8063 348/512 |
| 7,123,819 B2 * | 10/2006 | Harumoto | G11B 27/034 386/211 |
| 7,158,187 B2 * | 1/2007 | Suzuki | G11B 20/10527 348/515 |
| 7,165,098 B1 | 1/2007 | Boyer et al. | |
| 7,761,892 B2 | 7/2010 | Ellis et al. | |
| 8,046,801 B2 | 10/2011 | Ellis et al. | |

(Continued)

*Primary Examiner* — Jefferey F Harold
*Assistant Examiner* — Humam Satti
(74) *Attorney, Agent, or Firm* — Haley Guiliano LLP

(57) ABSTRACT

System and methods for synchronizing supplemental media content to media content being provided by a different content source. The systems and methods may identify media content from user input, and determine a plurality of associated supplementary media. By monitoring and interpreting a data stream containing information about the primary media content, the systems and methods may interpret indicia of content ceasing and resuming and similarly cease and resume playback of the supplemental media in response, preserving the synchronicity of the multiple content sources.

22 Claims, 5 Drawing Sheets

(56) References Cited

U.S. PATENT DOCUMENTS

| | | | |
|---|---|---|---|
| 8,799,757 B2* | 8/2014 | Jewsbury | G11B 27/005 715/200 |
| 2002/0082845 A1* | 6/2002 | Sato | H04N 21/2368 704/500 |
| 2002/0174430 A1 | 11/2002 | Ellis et al. | |
| 2003/0110499 A1 | 6/2003 | Knudson et al. | |
| 2005/0186988 A1* | 8/2005 | Lim | H04N 1/00281 455/557 |
| 2005/0251827 A1 | 11/2005 | Ellis et al. | |
| 2006/0274214 A1* | 12/2006 | Carro | H04N 21/4113 348/722 |
| 2008/0313682 A1* | 12/2008 | Kajiura | H04N 7/17318 725/93 |
| 2009/0055557 A1* | 2/2009 | Namai | G11B 27/329 710/14 |
| 2009/0129756 A1* | 5/2009 | Jeong | H04N 21/41407 386/248 |
| 2010/0077306 A1* | 3/2010 | Shaffer | G09B 15/00 715/716 |
| 2010/0153885 A1 | 6/2010 | Yates | |
| 2012/0128333 A1* | 5/2012 | Miyake | H04N 5/913 386/259 |
| 2013/0010195 A1* | 1/2013 | Daioku | H04N 5/775 348/552 |
| 2013/0173742 A1* | 7/2013 | Thomas | H04L 65/4076 709/217 |
| 2013/0188923 A1* | 7/2013 | Hartley | H04N 9/87 386/241 |
| 2015/0213839 A1* | 7/2015 | Woodman | G11B 27/105 386/248 |
| 2015/0296247 A1* | 10/2015 | Glasser | H04L 65/4084 725/74 |
| 2015/0373395 A1* | 12/2015 | Schmieder | H04N 9/8715 386/241 |
| 2018/0035250 A1* | 2/2018 | Innes | G10L 21/0205 |

* cited by examiner

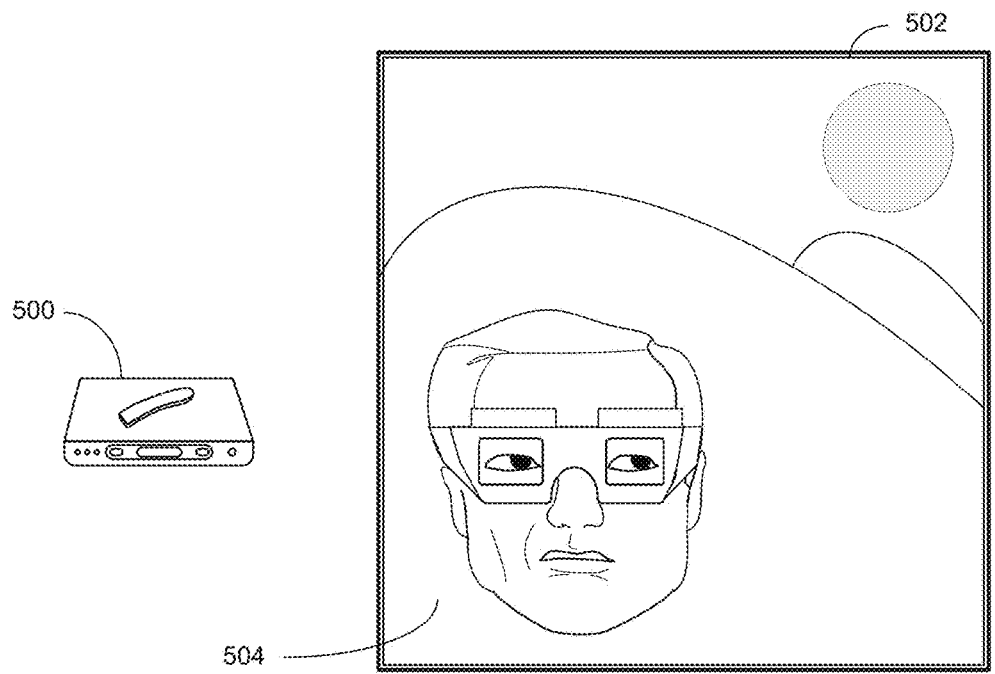
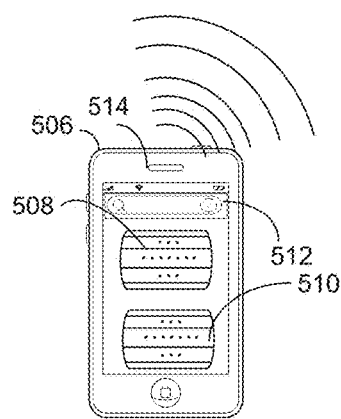
FIG. 5

600

602 Receive user input from a first device which identifies a video asset

604 Cross reference that video asset with a database at a second device to identify audio assets that might accompany the video asset.

606 Transmit an audio asset from the second device to the first device.

608 Receive, at the second device, a data stream corresponding to the playback of the video asset.

610 Monitor the data stream at the second device and check for an indicium that the playback of the video asset has ceased.

612 In response to an indicium that the video has ceased, transmit an instruction to pause the playback of the audio asset on the first device

614 Monitor the data steam at the second device and check for an indicium that the playback of the video asset has resumed

616 In response to an indicium that the video asset has resumed, transmit an instruction to resume playback of the audio asset on the first device

FIG. 6

METHODS AND SYSTEMS FOR SYNCHING SUPPLEMENTAL AUDIO CONTENT TO VIDEO CONTENT

BACKGROUND

In conventional systems, users typically have access to a plethora of media content. Moreover, users typically have access to content from various sources that supplements content from other sources. However, content delivered from multiple sources often fails to synchronize properly, which may result in mismatched audio, video, subtitles, etc. This may result in users having to continuously monitor and adjust the playback of their various media content and suffering from an overall poor user experience.

SUMMARY

Accordingly, methods and systems are described herein for synching content from multiple sources such that a user is relieved from having to continuously monitor and adjust the playback of the various content. For example, a media guidance application described herein may automatically synch audio content received from a first source to video content received from a second source. In one possible scenario, the media guidance application might deliver an alternate language track to a device while monitoring an accompanying broadcast in real-time. If the broadcast is paused or interrupted, either for an advertisement or in response to a user request to pause the broadcast, the media guidance application will pause the language track without any additional user input. The media guidance application may then automatically resume the language track when the broadcast is resumed. Thus, the media guidance application continuously monitors and adjusts the playback of various media content increasing the overall user experience.

In some aspects, a media guidance application may receive, from a first device, a user input identifying a video asset. For example, the media guidance application may receive the title of a television show, the broadcast time and channel when a show will be aired, or metadata about a show requested on-demand.

The media guidance application may cross-reference a database of audio assets and video assets, at a second device, to find audio assets associated with the video asset. For example, the media guidance application may cross-reference a database for audio files associated with the broadcast version of the film "Total Recall," and find a number of alternate language tracks in English, Spanish, and French along with the director's or user generated audio commentary associated with the film.

The media guidance application may then transmit one or more audio assets from the second device to the first device. For example, if the media guidance application cross-references the database and finds only a single audio asset available, that asset may be transmitted automatically. Alternately, if cross-referencing the database finds multiple alternate language tracks, the media guidance application may transmit all the audio assets from the second device to the first device, or a particular audio asset may be chosen based on known user preferences. For example, if the media guidance application knows that a user is a native French speaker with a preference for French dubbings, the French language track may be transmitted automatically.

The media guidance application may then receive a data stream corresponding to playback of the video asset at the second device. For example, the data stream may contain a continuous stream of packets that indicate progress in the playback of the video, or periodic data packets containing acknowledgements indicating that the video is playing.

The media guidance application may then monitor the data stream at the second device for an indicium that the playback of the video asset has ceased. For example, the media guidance application may monitor the data stream for an indication of a commercial break interruption, or an indication that the user has manipulated the video by pausing, fast-forwarding, or rewinding the playback of the video asset.

The media guidance application may then transmit an instruction to pause playback of the audio asset on the first device in response to detecting an indicium that the video asset playback has ceased. For example, if the media guidance application detects that the video has been interrupted for commercials, or that the user has paused playback, the media guidance application may instruct the first device to pause playback of the alternate language track.

The media guidance application may then monitor the data stream at a second device for an indicium that the playback of the video asset has resumed. For example, the media guidance application may monitor the data stream for an indicator that a television show has resumed after a commercial break, or that a user has un-paused a movie.

The media guidance application may then transmit an instruction to the first device to continue playback of the audio asset in response to detecting that the video asset has resumed. For example, once the media guidance application detects that a movie begins playing again, it may send an instruction to resume the alternate language track on the first device.

In some embodiments, the media guidance application may compare a playback location of the audio asset to a playback location of the video asset, and transmit an instruction to alter the playback location of the audio asset in response. For example, a user may be watching a stream of the movie "Twilight" on-demand, and the movie momentarily lags while buffering. The media guidance application may compare the current playback location of a supplemental audio track to the current playback location of the movie, and transmit an instruction to update the playback location of the audio track in response to detecting that the playback locations are different.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will become apparent with consideration of the following detailed description, taken in conjunction with the accompanying drawings, in which like reference characters refer to like parts throughout, and in which:

FIG. 5 shows an illustrative cross-platform interactive media system in accordance with some embodiments of the disclosure;

FIG. 6 is a flow-chart of illustrative steps involved in synching video content and supplemental audio content, in accordance with some embodiments of the disclosure.

DESCRIPTION

Figure 1:
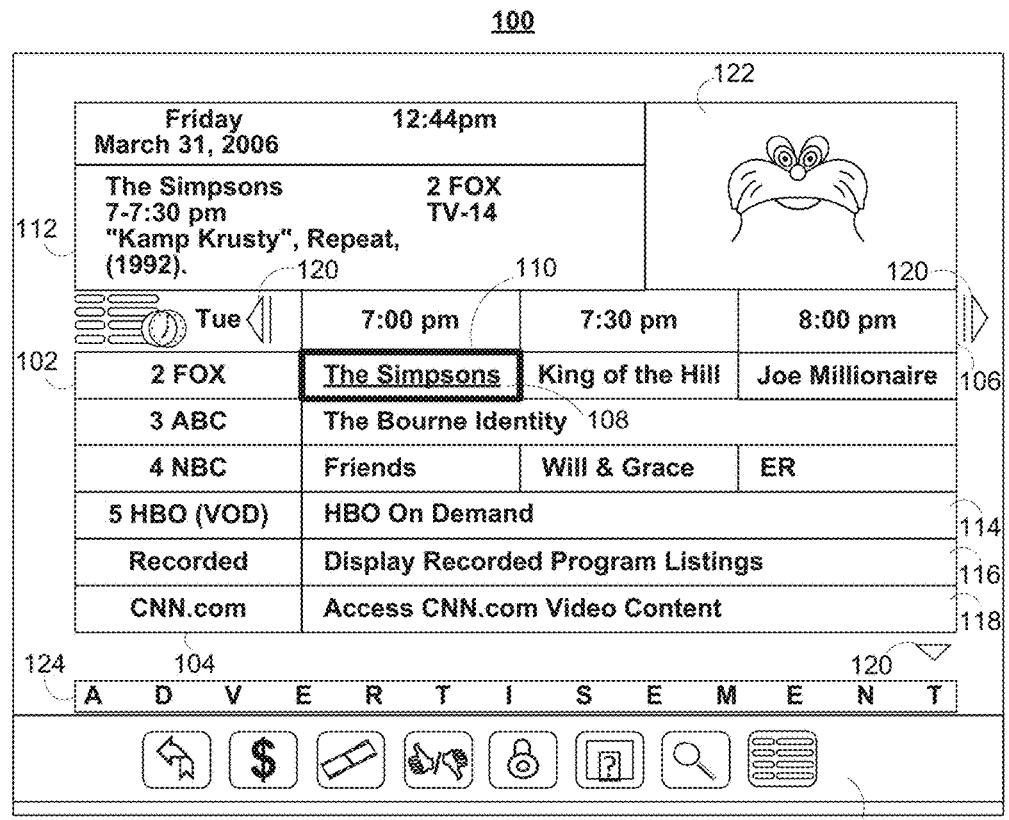
FIG. 1 shows an illustrative example of a media guidance display that may be presented in accordance with some embodiments of the disclosure.

Methods and systems are described herein for synchronizing content from multiple sources in an automated fashion, relieving a user from having to continuously monitor and adjust the playback of the content from multiple sources. For example, a media guidance application described herein may automatically synch audio content received from a first source to video content received from a second source. In one possible scenario, the media guidance application might deliver an alternate language track to a device while monitoring an accompanying broadcast in real-time. If the broadcast is paused or interrupted, either for an advertisement or a user request to pause, the media guidance application will pause the language track without any additional user input, and automatically resume the language track when the broadcast is resumed.

As referred to herein, a "media guidance application" or "guidance application" is an application that allows users, through an interface, to access content that they may desire. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same.

Media assets may include video assets and audio assets. As referred to herein, "a video asset" or "video content" is a media asset containing video, images, pictures, or other visual media. As referred to herein, "an audio asset" or "audio content" is a media asset containing, sounds, songs, spoken words, or other audible components. Both video content and audio content may constitute a portion of multimedia content. For example, a video asset or video content may be a particular episode of a television show, a film, a particular clip from a television show or movie, an advertisement, an internet video, or video taken from multimedia content. Examples of audio assets or audio content may include alternate language tracks, director's commentary, user commentary, advertisements, songs, speeches, or audio taken from multimedia content. As referred to herein, the term "multimedia" or "multimedia content" should be understood to mean content that utilizes at least two different content forms described above, for example, text, audio, images, video, or interactivity content forms. Content may be recorded, played, displayed or accessed by user equipment devices, but can also be part of a live performance.

Media content may also be supplemental content. As referred to herein, "supplemental content" or "supplemental media" should be understood to be any content associated with a media asset that enhances the media asset. For example, supplemental content may include audio assets such as alternate language tracks and commentary that accompany a movie. Supplemental content may also be other forms of media, like video or text. For example, a subtitle track associated with a particular TV show, user-recorded video commentary or "reaction" videos, or a set of slides or interactive media intended to accompany a live performance or pre-recorded speech.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, a media guidance application may receive, from a first device, a user input identifying a video asset. As referred to herein, user input should be understood to be any type of text, image, audio, key-press, selection, gesture or data either provided by a user, a user device, or provided by a device in response to a user. For example, user input may be the name of a movie or television show typed into a phone or tablet computer, or a selection made from an interactive program guide being presented to a user, or images or audio taken from cameras or microphones located on a user device.

For example, the media guidance application may receive the title of a movie, or the broadcast time and channel when a television show will be aired, or metadata about a show requested on-demand. If the media guidance application receives the name of a movie as text, the media guidance application may then cross-reference the name of the movie against a database of known video assets, using the name or portions of the name as search terms in order to identify the video asset. For example, if the media guidance application receives the text, "The Matrix," the text may be used as a search term to search a database and identify the film "The Matrix."

To assist the media guidance application in the search process, the database used to identify video assets may store known video assets along with data and metadata about the video assets. For example, episodes of television shows in the database may be stored with information identifying the name of the show, the name of the episode, the season and episode number, the original air date, the length of the show, broadcasts scheduled for the near future, media guidance data, and unique video identifiers associated with particular episodes. The media guidance application may then use any of these categories of information to search through the database and help identify video assets.

The media guidance application may also use information about the time and channel when a television show will be aired to cross-reference a database containing scheduled program and media listings. For example, if the media guidance application receives "8:00 pm" and "Nickelodeon," it may directly look up a database containing show listings to find the exact movie or television show episode scheduled to be broadcast at 8:00 pm on Nickelodeon. Similarly, if the media guidance application receives a user selection from an interactive television guide, media guidance data or metadata may be used to either produce relevant search terms, or may be used to directly look up the selected show in a database. Alternatively or additionally, the media guidance application may use any media guidance data to identify a video asset.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

For illustrative purposes, the systems and methods described herein may describe the first device as a "user device." As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices.

With the advent of enhanced image and voice recognition capabilities, it may also be possible for the media guidance application to identify video assets from user input in the form of a verbal command, image or video. For example, the input may be a spoken verbal request, an audio clip recorded from a multimedia source by a device microphone, or an image such as a movie poster, QR code, text, or a picture of a DVD or Blue-Ray copy of a movie. The media guidance application may analyze these types of audio and visual with optical character recognition (OCR) or voice recognition software to extract search terms. The media guidance application may also take the audio or visual input, or audio and video fingerprints generated from the input, and cross-reference a database of samples in order to identify the content of the image and produce relevant search terms.

For example, the media guidance application may receive an image containing box art for the movie "Avatar." Through optical character recognition the name "Avatar" may be extracted as text, and can be cross-referenced against a database of known video assets to identify the video asset as the film "Avatar." Similarly, the image may be compared against a database of known images to identify the image content, which may result in the image being recognized as the Blue-Ray box-art associated with the film "Avatar." As another example, the media guidance application may receive a short audio recording. The media guidance application may either generate an audio fingerprint from the recording or send the recording to a server to be fingerprinted. By comparing the audio fingerprint against a database it may be identified as a small portion of the song "My Heart Will Go On" by Celine Dion. The media guidance application may use that information to search a database for films associated with the song, or for films that contain the song on its soundtrack, such as the film "Titanic." Similar audio fingerprinting techniques may be used to identify recorded dialogue or sound effects from a particular video asset as well.

If the user input is ambiguous or a video asset is not able to be uniquely identified, the media guidance application may provide a list of possible assets and request further user input. Context clues or searching algorithms may be used to help narrow the possible video assets or rank them before a selection is provided to a user.

As referred to herein, context clues should be understood to be any type of data, metadata or information gathered from users, user input, user devices, or other devices communicating with the media guidance application. This may include information such as the time the request was made, known user preferences or a user signature associated with past user behavior, statistical analysis of past requests made by other users, metadata associated with content or content providers, or information available from sensors embedded either the user device or other devices accessible by the media guidance system. These sensors may include cameras, microphones, accelerometers, gyroscopic sensors, global positioning systems (GPS) or other electromechanical or electrochemical sensors.

For example, if the user input is a verbal request for "Simpsons," the user signature may indicate that the user habitually requests supplemental media for the 8:00 PM Monday night broadcast of "The Simpsons" airing on the FOX network. Additionally, the media guidance application may have access to context clues which indicate that the request is being made from the user's home at 7:56 PM Monday night. In this case, the media guidance application may determine with a high probability that the user input is attempting to identify a particular episode of "The Simpsons" to be broadcast at 8:00 PM Monday night on the Fox Network. The media guidance application may then search through media guidance data or a television listing stored on a server to identify the particular episode of "The Simpsons" scheduled for the 8:00 PM Monday night Fox broadcast as "The Simpsons: Treehouse of Horror XXIV." This may be presented to the user along with a request to confirm that the video asset requested is indeed "The Simpsons: Treehouse of Horror XXIV." The media guidance application may also present the listing along with suggestions for other possible video assets, advertisements, or additional information about the television show such as the scheduled broadcast time and station or a short description of the episode.

Once a video asset has been uniquely identified, the media guidance application may use that information to cross-reference a database, on a second device, to find audio assets associated with the video asset. The database may be located locally, or the media guidance application may use a network connection to access an external database. External databases may be owned and operated by media companies, content providers, information providers, or they may be maintained by users to store information about user generated supplementary content.

The database may contain listings of various video assets along with listings of audio assets associated with each video asset. For example, if the video asset was identified as the film "Jurassic Park," the media guidance application may cross-reference the database for audio files associated with the film "Jurassic Park," and find a number of alternate language tracks in English, Spanish and French along with the director's audio commentary, a "RiffTrax" comedy commentary available for purchase, "clean" language tracks that have been edited to remove coarse language, or user generated audio commentary associated with the film.

A database containing listings of video assets along with supplementary audio assets is described for illustrative purposes only. The methods and systems described herein may be applied to any type of content, and any type of supplemental content, such as video overlays, subtitles, interactive media, etc. In some embodiments, the media guidance application may also cross-reference multiple databases to find supplementary content associated with the video asset. For example, the media guidance application may find different supplemental content among databases operated by various content providers, film studios, and third party sources.

The media guidance application may then transmit one or more audio assets to the first device. In some embodiments, the media guidance application may stream the audio asset directly to the user device with an appropriate buffer. In this case, the media guidance application may wait until the video asset has begun playing before beginning the transmission. In other embodiments, the media guidance application may transmit either the entire audio asset or a portion to the user device before playback of the video asset begins. In this case, the media guidance application may wait until the video asset has begun playing before transmitting an instruction to the user device to begin playback of the audio asset.

If the media guidance application identifies multiple audio assets associated with a particular video asset, the user may be prompted to select which one they would like to have transmitted to the user device. For example, if multiple alternate language tracks were associated with the film "Spaceballs," the user may be presented with a selection screen and asked to choose which one they would like to have transmitted to their device. The media guidance application may also use context clues to rank the various audio assets before they are presented to the user. For example, if the media guidance application knows that a user is a native French speaker with a preference for French dubbings, the French language track may be presented prominently among the other options, or the French language track may be suggested to the user with an option to decline and choose an alternative audio asset. As an alternate example, if the media guidance application detects that the operating system on the user device has the language set to Mandarin, or if the media guidance application detects users speaking in Mandarin from a microphone embedded within the user device, it may suggest Mandarin language tracks to the user by default.

In some embodiments, the media guidance application may transmit multiple audio assets to the first device. For example, the media guidance application may transmit both the director's commentary along with an English language track. The media guidance application may then present the user with an option to toggle between the two audio assets during playback of the video asset without needing to go through the process of identifying the video asset again. This may be achieved by either transmitting multiple audio assets to the user device simultaneously and maintaining separate buffers, or alternating which audio asset is streamed and switching between the audio assets in response to a user selection.

In some embodiments, the media guidance application may transmit one or more audio assets from the second device to the first device. The audio assets may be stored on the same database containing information about various video assets associated with their associated audio assets. In this case, the media guidance application may transmit the audio asset directly from the database to the user device.

In other embodiments, the audio assets may be stored separately from the database containing information about various video assets associated with their associated audio assets. For example, the media guidance application may search the database at the second device to identify audio assets that are available from a number of different film studios or content providers. The media guidance application may then transmit a particular audio asset to the user device by first retrieving it from the appropriate database owned and operated by the appropriate film studio or content provider.

The media guidance application may then receive a data stream corresponding to playback of the video asset at the second device. The data stream may contain a continuous stream of packets that indicate progress in the playback of the video, or periodic data packets containing acknowledgements indicating that the video has begun playing and is continuing to play. The data stream may also be populated with supplemental information and indicia transmitted from content providers, external databases, user devices, user displays etc.

In some embodiments, the data stream may provide a real-time update of a particular frame, time-mark, etc. that may be used by the media guidance application to determine the current point in playback of the video asset. Alternatively or additionally, the data stream may include data on a portion of the video asset currently presented to a user. For example, the media guidance application may use a content recognition module or algorithm to generate data describing the context, content, and/or any other data necessary for determining a current playback position of the video asset. For example, the content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine objects in a portion of the video asset currently presented to a user.

For example, the media guidance application may receive data in the form of a video. The video may include a series of frames. For each frame of the video, the media guidance application may use a content recognition module or algorithm to determine the objects (e.g., people, places, things, etc.) in each of the frames or series of frames. The media guidance application may cross-reference the determined object with a database that lists objects found in particular portions of the video asset to determine the portion of the video asset currently being played back.

In some embodiments, the content recognition module or algorithm may also include speech recognition techniques, including, but not limited to, Hidden Markov Models, dynamic time warping, and/or neural networks (as described above) to translate spoken words into text and/or processing audio data. For example, the media guidance application may cross-reference an identified spoken word with a database that lists spoken words found in particular portions of the video asset to determine the portion of the video asset currently being played back.

The data stream may also include various indicia. As referenced herein, indicia, indicium, or indicators should be understood to be any data, datum or metadata contained within the data stream that provides information about users, user inputs, user devices, media content, and/or the playback of media content. For example, indicium in the data stream may include information transmitted from content providers corresponding to content playback, context clues provided by a user device, identifiers and digital tags inserted into the data stream by content providers, information from a user display indicating device settings, or data reporting user actions such as performing a playback operation. As referred to herein, a "playback operation" refers to any media guidance application operation that relates to playing back a media asset. In some embodiments, the media guidance application may perform a fast-access playback operation. As referred to herein, the phrase "fast-access playback operations" should be understood to mean any playback operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter, or any other operation that does not play back the media asset at normal playback speed. The fast-access playback operation may be any playback operation that is not "play," where the play operation plays back the media asset at normal playback speed.

For example, an indicium that an advertisement is beginning may take several forms. A content provider may send a small digital tag into the data stream indicating that the video playback has reached a point where a commercial may be inserted, or that a commercial is about to begin. Similarly, advertisement providers may send a small digital tag into the data stream when the advertisement begins and ends. If the advertisement is proceeded by a certain all black frame, or if the first frame of the advertisement is known, then video currently being transmitted to a display may also be an indicium of an advertisement beginning. Similar indicia may also indicate when an advertisement ends and a video resumes playback.

The media guidance application may then send instructions to manipulate the playback of the supplementary content in response to the information being monitored in the data stream. These instructions may be context-sensitive, depending on the type of content being delivered, information contained in the data stream, or various context clues. These instructions may be transmitted via Bluetooth, Wi-Fi, near field communication, radio, telecommunication networks such as 3G or 4G, or any other convenient means of communication.

As referenced herein, instructions should be understood to be any request transmitted to a device to manipulate device settings, manipulate content playback, alter device behavior, or elicit a response from the device. Possible instructions include stopping and starting playback of the supplementary content, altering the playback location of the supplementary content, or switching between multiple content sources. Other possible instructions may include altering user device settings such as screen dimness, volume, etc. or instructing the user device to display advertisements.

In some embodiments, the media guidance application may also transmit certain instructions to the device providing the audio content to the user device. For example, the media guidance application may transmit an instruction to change the playback location of supplementary audio content in response to detecting that a user has skipped to a different scene in a movie. If the audio asset has been pre-loaded to the user device, or the new playback location is already contained within a buffer on the user device, the instruction may be sent to the user device directly. If the audio asset is being streamed and the new location does not exist within the buffer on the user device, the instruction may instead be sent to the database providing the audio asset and the database may change the portion of the audio asset being streamed.

If a video asset is already playing, the media guidance application may transmit an instruction to begin playback of the audio asset at the corresponding location to the first device. This may be done by first determining the playback location of the video asset by either monitoring the database for an indicium of the playback location of the video asset, or by directly requesting the information from the content provider. In some embodiments the media guidance application may stream the audio asset directly to the user device with an appropriate buffer. In this case, the media guidance application may wait until the video asset has begun playing before beginning the transmission. In other embodiments, the media guidance application may transmit either the entire audio asset or a portion of the audio asset to the user device before playback of the video asset begins. In this case, the media guidance application may wait until the video asset has begun playing before transmitting an instruction to the user device to begin playback of the audio asset.

Once a video asset is playing, the media guidance application may monitor the data stream for an indicium that the playback of the video asset has ceased. The media guidance application may monitor the data stream using detection and control circuitry.

As referenced herein, "ceased" should be understood to mean that content is either paused, or is no longer being played back to the user. For example, a video asset may be ceased if it is interrupted for commercial break, if a user pauses the video, if a different video asset or portion of a video asset is presented to a user as a result of a user request or the scheduled end of the first video, or if a user brings up a menu guide or changes the input on their display.

Possible indicium that a video asset has ceased may include data about the playback status of the video, indicia that there have been interruptions for commercial breaks, or input received from a user input device such as a tablet or remote control to "pause" playback, etc. For example, the media guidance application may monitor the data stream for an indicium that the video asset has been interrupted for a commercial break transmitted from a content provider.

Once the media guidance application detects that a video asset has ceased, the media guidance application may transmit an instruction to pause playback of the audio asset on the first device. For example, if the user device is playing an Italian language track for the film "Finding Nemo," which is being streamed through an advertisement supported online content provider, the media guidance application may detect an indicator that the film is being interrupted for a commercial break. In response, the media guidance application may send an instruction to stop playback of the language track on the user device.

Once the supplementary audio is paused, the media guidance application may then monitor the data stream at a second device for an indicium that the playback of the video asset has resumed. For example, the media guidance application may monitor the data stream for an indicator that a television show has returned from a commercial break, or that a user has un-paused a movie.

As referenced herein, "resumed" should be understood to mean that content is either un-paused, or no longer subject to a fast-access playback operation, or that content that was previously played back is once again being played back to the user. For example, a video asset may be resumed if it returns from commercial break, if a user un-pauses the video, if a user switches back to the video asset after having changed the channel or the device display to a separate broadcast, or if a user closes a menu that was being presented instead of the video asset.

In response to detecting that a video asset has resumed, the media guidance application may then instruct the first device to continue playback of the audio asset. For example, a user device may have been playing a director's commentary track associated with a particular video asset before playback of the video asset had ceased. Once the media guidance application detects that a movie begins playing again, it may send an instruction to resume the director's commentary track on the user device.

In some embodiments, the media guidance application may compare a playback location of the audio asset to a playback location of the video asset, and send an instruction to alter the playback location of the audio asset in response. The media guidance application may determine the playback locations of the video and audio assets by either monitoring the data stream or requesting data directly from the content providers. If the media guidance application determines that the playback locations do not match, or if there is an unacceptable delay between the two, the media guidance application may transmit an instruction to alter the playback location of the audio asset. For example, a user may be streaming the film "Jaws" and listening to an alternate language track. If playback of the film begins to lag slightly due to buffering, the playback location of the film may slightly lag the playback location of the alternate language track. The media guidance application may check the playback locations of the film and the audio track and transmit an instruction to change the playback location of the alternate language track to match the playback location of the film and correct for the lag. This process may be done periodically, for example, every 10 seconds, or it may be done in response to specific events like after detecting lag in the data stream, or irregular latency while trying to communicate with a device.

In some embodiments, the media guidance application may also instruct the user device to resume playback of the audio asset at an alternate playback location depending on the type of indicia detected. For example, if the first indicium that the video asset had ceased was an indication that a user had changed the channel, when the media guidance application detects that the video asset has resumed it may instruct the user device to resume playback of the audio asset at a later playback location to compensate for the time when the video asset was still being broadcast despite not being played back to the user.

If the delay time between the media guidance application detecting that the video asset has resumed and the user device responding to the instruction to resume playback of the supplementary content is sufficiently small, there may be no need for further adjustment. If the delay time is noticeable, the user may be able to fine-tune the playback of the supplementary content manually, or the media guidance application may attempt to correct for the delay automatically. If the delay time between detecting an indicium and the user device responding is known, the media guidance application may account for that by instructing the playback of the audio asset to resume at a slightly later time to compensate. For example, if it is known that there is a delay of 100 ms between the media guidance application detecting an indicium and a user device responding to an instruction to resume playback of the audio asset, the instruction to resume the playback of the audio asset will contain an instruction to begin playback at a playback location 100 ms further than where playback of the audio asset was paused. Similarly, if there is a delay between the media guidance application detecting an indicium that a video asset has ceased and playback of an audio asset being paused, the added delay may be corrected for when the audio asset resumes playing.

In some embodiments, it may also be possible to refine the measurement of the delay time by measuring the response times of the user device and the devices providing information to the data stream, or by combining this information with known information about the user device. For example, the media guidance application may send an initial instruction to resume playback of the audio asset in response to detecting an indicium that the video asset has resumed. The media guidance application may then ping the user device and determine the delay between an instruction being sent and an instruction being received. The media guidance application may then ping the device that provided the indicium to the data stream and determine its response time as well. The media guidance application may then use this information to determine the total time delay between detecting an indicium in the data stream and a corresponding instruction being processed by the user device. A second instruction may then be sent to the user device to account for this time delay by altering the playback location of the supplemental content. This process may be repeated a number of times to generate statistics about average delay times, which may be used to further refine the measurement [ATTY: MISSING WORD HERE?]. This process may also be refined by using statistics gathered from either a particular user device or a particular type of user device. For example, the media guidance application may have statistics which indicate that an "iPhone 6" has a typical delay time of 100 ms between receiving an instruction and actually resuming playback of the audio content, or that a particular user device is set manually to compensate for a total delay time of 250 ms. This information could be combined with the delay time determined by pinging the user device and the devices providing information to the data stream to better synchronize content playback. This process of measuring delay times by pinging the user device and the various devices providing information to the data stream may also be done in the background at regular intervals or before playback of the audio asset beings.

In some embodiments, the media guidance application may use context clues to help resynchronize the audio and video content. If certain information in the data stream is unreliable or temporarily unavailable, other context clues may also be used by the media guidance application to determine if a video is paused or has become desynchronized. For example, a portion of an image taken from a camera on a user device may show the display that the user is using to watch the video asset. The media guidance application may compare that portion of the image to image frames contained in the video asset. If the portion of the image does not match an image frame taken from the video asset at the appropriate playback position, the media guidance application may know that playback of the video asset has ceased or has otherwise become desynchronized. The media guidance application may also compare the portion of the image to images frames within a certain set of playback locations within the video asset to determine if the video asset has been rewound, fast-forwarded, or otherwise manipulated.

In some embodiments, the media guidance application may determine that the user has ceased watching the video asset. For example, the media guidance application may detect an indicium in the data stream that the user device has been used to answer a phone call and determine that the user's attention has been diverted. Similarly, context clues taken from accelerometers or GPS within the user device may indicate that the user has walked away from the display. In response, the media guidance application may transmit an instruction to mute playback of the audio asset until the user returns, or transmit instructions to pause playback of both the audio asset and the video asset.

In some embodiments the media guidance application may also manipulate playback of the supplementary content in response to detecting an indicium in the data stream. For example, the media guidance application may detect indicia that the user is trying to lower the volume on their home-entertainment center despite the home-entertainment center audio already being muted. If the media guidance application detects that the only audio associated with the video content is supplementary audio being played on a user device, the media guidance application may determine that the user is attempting to lower the playback volume of their supplementary audio and send the corresponding instruction to the user device to lower the playback volume of the supplementary audio. Similarly, if the media guidance application detects that the only audio currently being played is supplementary audio, the media guidance application may take any indicia monitored in the data stream to manipulate the audio and transmit the corresponding instruction to the user device to manipulate the supplementary audio.

Figure 2:
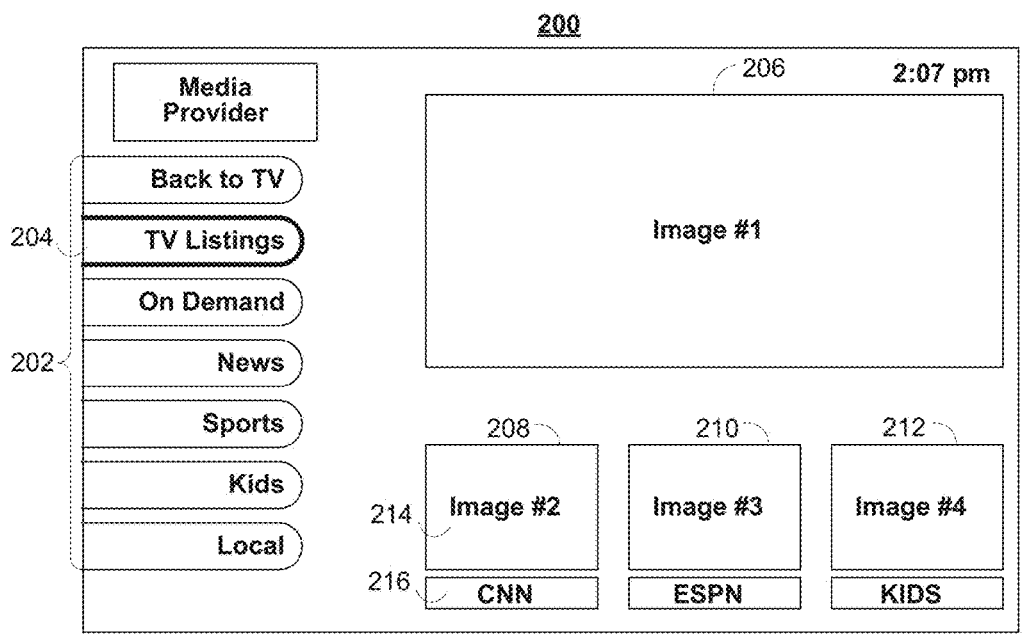
FIG. 2 shows another illustrative example of a media guidance display that may be presented in accordance with some embodiments of the disclosure.

For illustrative purposes FIGS. 1-2 show possible display screens that may be used to provide media guidance data. For example, a user may select a video asset from FIGS. 1-2, and a media guidance application may automatically synchronize supplemental content to the presentation of the video asset. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content; provide information about a product or a service; enable purchasing of content, a product, or a service; provide content relating to the advertisement, etc. Advertisement 124 may be targeted based on a user's profile/preferences, monitored user activity, the type of display provided, or on other suitable targeted advertisement bases.

While advertisement 124 is shown as rectangular- or banner-shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No.

7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
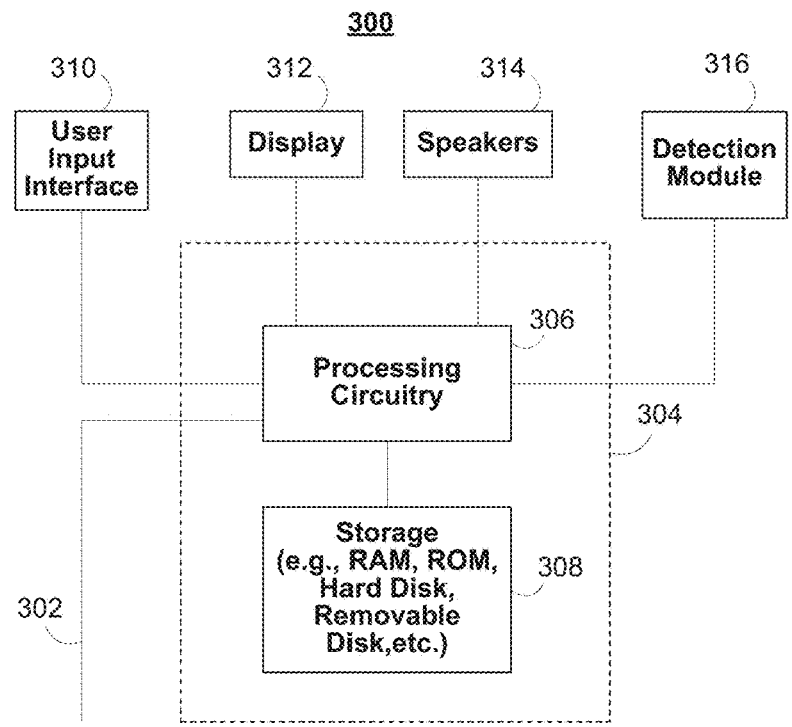
FIG. 3 shows an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314. The user equipment device may also contain a detection module (316) to provide supplementary input which may be used by the processing circuitry. A detection module can be used to interface with a camera, a microphone, accelerometers, gyroscopic sensors, global positioning systems (GPS) or other electromechanical or electrochemical sensors with which the user device is equipped, either with or without direct user input.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
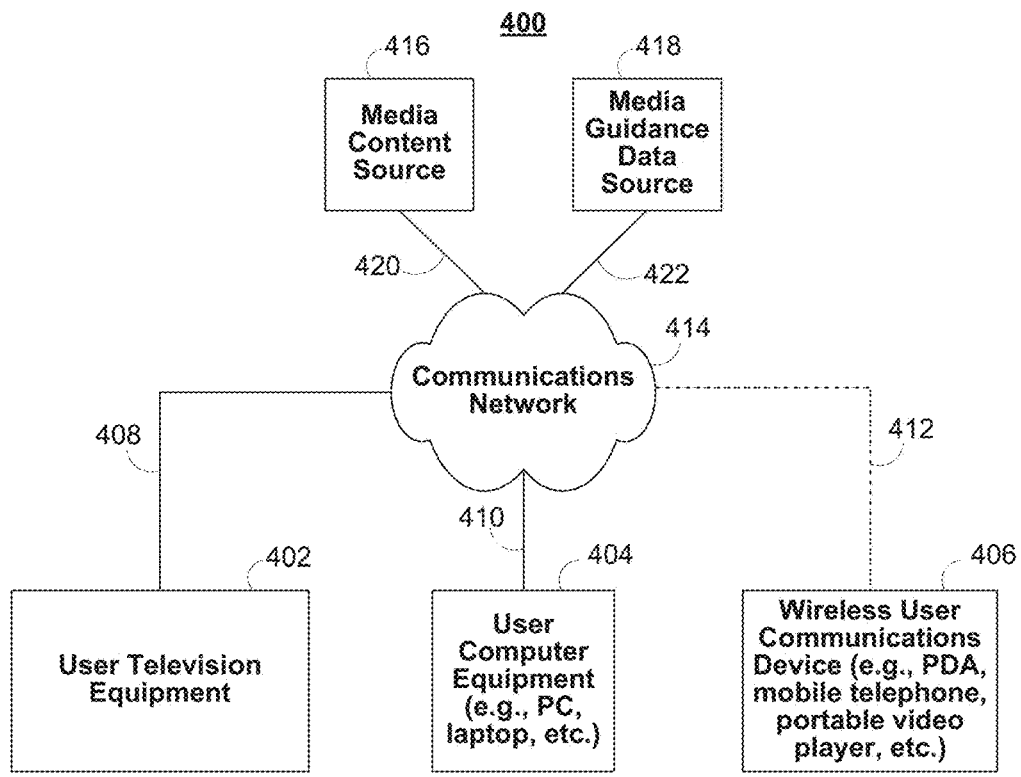
FIG. 4 is a diagram of an illustrative cross-platform interactive media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, are discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having a content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 illustrates an example of a media guidance application synchronizing audio and video across a cross-platform interactive media system in accordance with some embodiments of the disclosure. A media guidance application may act as a central hub communicating between set top box 500, display 502 capable of displaying video asset 504, and user device 506. The device may be a smart phone, tablet, computer, hand-held entertainment device, or any other type of user equipment (e.g., user equipment 402, 404 or 406 (FIG. 4)). The media guidance application may generate for display show listings and showtimes in the form of an interactive video guide on user device display 508. Show listings may be displayed in the form of individual cells 510 within the display. These cells may contain information such as showtimes, show descriptions, or other information typically found in a program listing display (e.g., program listing display 100 (FIG. 1)). The media guidance application may also use the interactive video guide generated on user device display 508 as a user input interface (e.g., input interface 310 (FIG. 3)) to interact with a user and receive user input. A user device may also be equipped with searching features 512, and have speakers 514 capable of audio output.

In some embodiments, user device display 508 may contain a full interactive television guide presented by the media guidance application, or it may list specifically shows and media assets where supplemental content is available. The user may request supplemental content for a show by selecting a show from the display, entering in text, or using searching features 512 within the device. After the media guidance application finds available audio assets to be played, it will transmit them to the user device. If several supplemental media assets are available the choices may be presented either on user device 506 or on display 502, and the media guidance application may receive a user input selecting a particular supplemental media asset. In some of the embodiments described below (e.g., in FIG. 6 or FIG. 7), the speakers 514 on user device 506 may be used to play the supplemental audio content, and the user device may receive instructions from the media guidance application in order to ensure that the supplemental audio content is synchronized properly with video asset 504.

FIG. 6 is an illustrative block diagram of a method for synching video content and supplemental audio content, in accordance with some embodiments of the disclosure. It is contemplated that the steps or descriptions of FIG. 6 may be used with any other embodiment of this disclosure. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4). In addition, one or more steps of process 600 may be incorporated into or combined with one or more steps of any other process or embodiment (e.g., process 700 (FIG. 7)).

In step 602, a media guidance application receives (e.g., via control circuitry 304 (FIG. 3)) a user input from a first device which identifies a video asset. In some embodiments the first device may be a user device (e.g., user device 506 (FIG. 5) being used as part of a cross-platform interactive media system shown in FIG. 5) which allows for user input. For example, the media guidance application may receive the name of a movie or television show or a time and broadcast channel as entered by a user onto their phone or tablet computer. The media guidance application may also determine metadata from a user input, which may be used to identify a video asset. With the advent of enhanced image and voice recognition capabilities, it may also be possible for the media guidance application to receive user input in the form of verbal commands, images or video. This input may be combined with other context clues such as the date, time, location of the user device, or either known user preferences or a user signature.

For example, the user may input (e.g., via user input interface 310 (FIG. 3)) a particular episode of "The Simpsons" by selecting it directly from an interactive television guide being presented by a media guidance application to either user device 506 (FIG. 5) or on display 502 (FIG. 5). In an alternate example, the film "Pulp Fiction" may be identified if the user typed "Pulp Fiction," into search bar 512 (FIG. 5) within their device. The input may also be a spoken verbal request or an audio clip recorded from a multimedia source by a device microphone, or an image such as a movie poster, QR code, text, or a DVD or Blue-Ray copy of a movie. The media guidance application may analyze these types of audio and visual input by OCR or voice recognition software, or with known audio and video fingerprinting techniques.

In some embodiments, the first device may contain detection module 316 (FIG. 3) which will be capable of determining user input from the surrounding environment, even if the user is not currently navigating an interactive television guide. For example, if the media guidance application detects that a movie is being played in the background (e.g., using object recognition techniques discussed above), it may use that information instead of other user inputs in order to search for supplemental content and present it to the user.

If the user input is ambiguous or a video asset is not uniquely identified, context clues or searching algorithms may be used to either identify the asset, or the media guidance application may provide a list of possible assets and request further user input. For example, if the user inputs "Simpsons on FOX," the media guidance application may assume that the user input is trying to indicate a particular episode of "The Simpsons" airing on the FOX network. From context clues such as the time the request was made, the media guidance application may either assume that the user input identified a particular episode to be played that night, or it may suggest a small list of episodes airing in the near future and request further user input.

In step 604, the media guidance application cross references (e.g., via control circuitry 304 (FIG. 3)) the identified video asset with a database (e.g., located at storage 308 (FIG. 3) and/or any location accessible via communications network 414 (FIG. 4)) at a second device to identify audio assets that might accompany the video asset. The audio assets may be alternate language tracks, director's commentary, user generated audio commentary, or either free or paid third party commentary. For example, if the media guidance application identified a video asset as the film "Top Gun," the audio assets associated with the film may be alternate language tracks in English, Spanish and French, along with the director's audio commentary or user generated audio commentary associated with the film. The database may also contain other types of content, for example, the database may also contain a number of subtitle tracks in alternate languages, or supplemental video content associated with the video asset.

In step 606, the media guidance application transmits (e.g., via control circuitry 304 (FIG. 3)) an audio asset from the second device to the first device. Depending on the results of the database search done in step 604, one or more audio assets may be transmitted to the first device. For example, if the media guidance application cross-references the database and finds only a single audio asset, that audio asset may be transmitted from the database to the first device. If multiple audio assets are identified, the media guidance application may either prompt the user for additional input (e.g., via control circuitry 304 (FIG. 3) via user input interface 310 (FIG. 3)) to select one of the possible audio assets, or the media guidance application may transmit an audio asset based on prior known user behavior or user preferences. For example, the user is known to be a native German, or to have a history of requesting German dubbings, a German language track may be transmitted automatically. In other embodiments it may be possible to transmit all of the audio assets to the user device, and the user device may make the determination of which of the audio assets to play.

In some embodiments, the media guidance application may transmit (e.g., via control circuitry 304 (FIG. 3)) the audio asset once the video asset has begun playing. The media guidance application may determine if a video asset has begun playing by either monitoring a data stream (e.g., via control circuitry 304 (FIG. 3)) or by waiting until the video asset is scheduled to begin playing if the scheduled broadcast time is known (e.g., from information provided by content source 416 or media guidance data source 418). Once the video asset begins, the audio asset will be streamed (e.g., through communications network 414 (FIG. 4)) directly to the first device. In other embodiments the audio asset will be sent to the first device in its entirety, and the media guidance application will send instructions to the first device to begin playback when the video asset begins playback.

In some embodiments the media guidance application may synchronize the audio asset to be played through speakers on the first device (e.g., speakers 514 (FIG. 5) located on user device 506 (FIG. 5)) and the video asset to be presented on a display (e.g., display 502 (FIG. 5)) by instructing them to begin playing simultaneously, accounting for possible lag times and delays. In other embodiments the media guidance application may receive user input while a video asset is already being presented to the user. In this case the media guidance application may synchronize the video asset played on a display (e.g., display 502 (FIG. 5)) and the audio asset being transmitted to the first device (e.g., user device 506 (FIG. 5)) by determining the current playback location of the video asset (e.g., via control circuitry 304 (FIG. 3)), and sending an instruction to the first device to begin playback of the audio asset at a playback location that matches the current playback location of the video asset.

In some embodiments, the audio asset transmitted to the first device may be located on a separate database than the database cross-referenced to identify audio assets associated with a particular video asset. For example, a first database may contain information about multiple video assets and the various audio assets associated with them, along with information about separate databases hosted by content providers (e.g., media content source 416 (FIG. 4)) where each of the audio assets may be downloaded from. The media guidance application may cross-reference this first database to find audio assets associated with a video asset. Once the audio asset is identified, the media guidance application may contact the appropriate separate database hosted by a content provider to download the audio asset.

In step 608, the media guidance application transmits (e.g., via control circuitry 304 (FIG. 3)), to the second device, a data stream corresponding to the playback of the video asset. The data stream may contain information about the playback of the video asset, but it may also contain several types of information. For example, the data stream may contain a continuous stream of packets that indicate progress in the playback of the video, or periodic data packets containing acknowledgements indicating that the video is playing. The data stream may also contain supplemental information about user behavior or user actions. For example, the data stream may indicate whenever the user manipulates a video by fast-forwarding or rewinding, or it may indicate device volume settings and statistics about user activity.

In step 610, the media guidance application monitors (e.g., via control circuitry 304 (FIG. 3) or detection module 316) the data stream at the second device and checks for an indicium that the playback of the video asset has ceased. For example, the media guidance application may monitor the data stream for an indicator of an interruption for commercial break by checking the video being presented on display 502 (FIG. 5), or an indicator that the user has manipulated the video by pausing playback (e.g., through user input interface 310 (FIG. 3)). There might also be an indication that the user has changed the channel, or that user display 502 (FIG. 5) has been turned off entirely. Depending on the device receiving the video content, other indicators may correspond to the video ceasing. For example, the data stream corresponding to a video asset being delivered to a smart phone (e.g., wireless user communication device 406 (FIG. 4)), or computer (e.g., user computer equipment 404 (FIG. 4)) may contain indicators that the video asset has been interrupted for a phone call or by a pop-up or other notification.

In step 612, the media guidance application, in response to an indicium that the video asset has ceased, transmits (e.g., via control circuitry 304 (FIG. 3)) an instruction to pause the playback of the audio asset on the first device. For example, if the media guidance application detects (e.g., by monitoring the data stream via control circuitry 304 (FIG. 3) or detection module 316 (FIG. 3)) that the video has been interrupted for commercials, or that the user has paused playback, the media guidance application may transmit (e.g., via control circuitry 304 (FIG. 3)) an instruction via Internet to the first device to pause playback of the alternate language track.

In some embodiments, the media guidance application may compare the playback locations of the video and audio assets (e.g., via control circuitry 304 (FIG. 3) or detection module 316 (FIG. 3)) and alter the playback location of the audio asset in response. For example, if the data stream is temporarily unavailable, or if problems occur with communication network 414 (FIG. 4), the audio and video assets may become desynchronized. After comparing the playback locations, the media guidance application may transmit an instruction to user device 506 (FIG. 5) to alter the playback location of the audio asset and resynchronize the audio and video assets.

In step 614, the media guidance application monitors (e.g., via control circuitry 304 (FIG. 3)) the data stream at the second device and checks for an indicium that the playback of the video asset has resumed. For example, the media guidance application may monitor the data stream for an indicator that a television show has resumed after a commercial break, or that a user has un-paused a movie. It could also be the case that a user has resumed watching a television broadcast or movie after browsing away to watch a different program for a few minutes, or that a user has either closed a pop-up advertisement or ended a phonecall.

In step 616, the media guidance application, in response to an indicium that the video asset has resumed, transmits (e.g., via control circuitry 304 (FIG. 3)) an instruction to resume playback of the audio asset on the first device. In some embodiments, the media guidance application may transmit instructions to the user device over multiple communication channels (e.g., as part of communications network 414). For example, a media guidance application may have paused playback of an audio asset by transmitting an instruction to a user device via near field communication. If the user device goes out of range of the near field communication, the instruction to resume playback of the audio asset may be sent over Wi-Fi, Bluetooth, or whatever alternate communication channel may be convenient.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, performing steps in alternate order or in parallel may reduce the overall latency of the system or further improve the synchronization of the multiple sources of content. Furthermore, it should be noted that any of the devices or equipment discussed in relation to FIGS. 3-4 could be used to perform one or more of the steps in FIG. 6.

Figure 7:
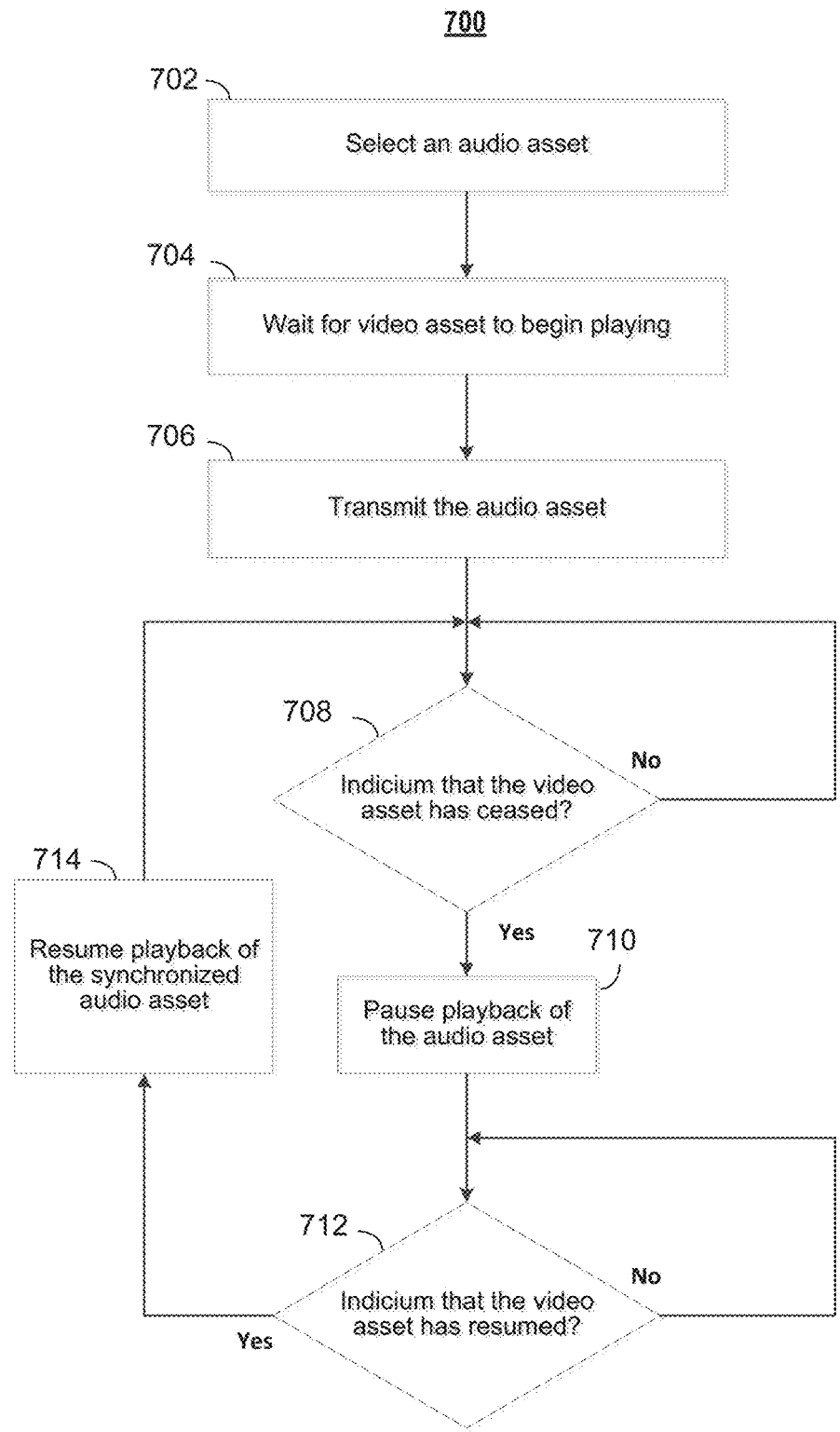
FIG. 7 is a flow-chart of illustrative steps involved in monitoring a data stream to synch content, in accordance with some embodiments of the disclosure.

FIG. 7 is a flowchart of illustrative steps for monitoring a data stream and synchronizing content, in accordance with some embodiments of the disclosure. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4). In addition, one or more steps of process 700 may be incorporated into or combined with one or more steps of any other process or embodiment (e.g., process 600 (FIG. 6)).

At 702, the media guidance application selects an audio asset (e.g., via control circuitry 304 (FIG. 3)) from a database (e.g., located at storage 308 (FIG. 3) and/or any location accessible via communications network 414 (FIG. 4)) to be transmitted to a user device (e.g., via I/O path 302 (FIG. 3)). As described above, the media guidance application selects an audio asset based on user input (e.g., via user input interface 310 (FIG. 3)), and the media guidance application transmits the audio asset from an external database or server.

At 704, the media guidance application waits for the video asset to begin playing. This may be done by monitoring (e.g., via control circuitry 304 (FIG. 3)) the content being delivered to the display or in some embodiments it may be done extrapolating information from images and audio retrieved from a user device.

At 706, the media guidance application transmits (e.g., via control circuitry 304 (FIG. 3)) the audio asset (e.g., located at storage 308 (FIG. 3) and/or any location accessible via communications network 414 (FIG. 4)). As described above, in some embodiments the media guidance application may transmit one or several audio assets to a user device.

At 708, the media guidance application checks for an indicium that the video asset has ceased. In some embodiments the media guidance application monitors a data stream corresponding to playback of the video asset, (e.g., via control circuitry (FIG. 3)). In some embodiments the media guidance application may also monitor the video asset indirectly through use of cameras, microphones, or other sensors (e.g., via detection module 316 (FIG. 3)).

At 710, the media guidance application pauses playback of the audio asset. In response to detecting an indicium that the video asset has ceased (e.g., via detection module 316 (FIG. 3)), the media guidance application may transmit an instruction to pause playback of the audio asset (e.g., via control circuitry 304 (FIG. 3)). In some embodiments, this may be done by transmitting an instruction to the user device to pause playback of the audio asset. In other embodiments, if the audio is being streamed directly to the user, it may be paused by either stopping the stream, or continuing to maintain the stream but transmitting silence rather than the audio asset.

In some embodiments the audio playback may be silenced or stopped if the media guidance application detects that the user has stopped watching the video asset (e.g., via detection module 316 (FIG. 3)). For example, using geo-location data from a user device (e.g., user device 506 (FIG. 5)), it may be determined that a user is now a substantial distance away from their home entertainment center and has stopped watching the video. The media guidance application may transmit instructions (e.g., via detection module 316 (FIG. 3)) to temporarily pause playback of the audio asset, or to adjust down the volume of the playback until the user has returned back to their home entertainment center (e.g., by lowering the volume of speakers 514 located on user device 506 (FIG. 5)).

In some embodiments, the media guidance application may detect that the video is still playing, but that it is not being currently played back to the user (e.g., via control circuitry 304 (FIG. 3) or detection module 316 (FIG. 3)). For example, the user may have changed the channel on display 502 (FIG. 5). In this case, the media guidance may transmit an instruction (e.g., via detection module 316 (FIG. 3)) to mute playback of the audio temporarily (e.g., by muting speakers 514 (FIG. 5) on user device 506 (FIG. 5)).

At 712, the media guidance application will check for an indicium that the video asset has resumed. In some embodiments the media guidance application monitors a data stream corresponding to playback of the video asset, (e.g., via control circuitry (FIG. 3)). In some embodiments the media guidance application may also monitor the video asset indirectly through use of cameras, microphones, or other sensors (e.g., via detection module 316 (FIG. 3)).

At 714, the media guidance application will resume playback of the synchronized audio asset. In response to detecting an indicium that playback of the video asset has resumed (e.g., via detection module 316 (FIG. 3) or using control circuitry 304 (FIG. 3) to monitor the data stream transmitted in step 606 (FIG. 6)), the media guidance application will transmit an instruction (e.g., via control circuitry 304 (FIG. 3)) to resume playback of the audio asset.

In some embodiments, the media guidance application will synchronize the audio and video assets by instructing (e.g., via control circuitry 304 (FIG. 3)) the audio asset to resume playback at a new location, for example, if the audio was paused in response to the user changing the channel, or if the user has skipped ahead in a movie. It may be possible for the media guidance application to determine the playback location of the video asset (e.g., via detection module 316 or control circuitry 304 (FIG. 3)), or to determine the portion of the video asset (e.g., video asset 504) that is currently being played back to the user. Once the playback location of the video asset has been determined, an instruction may be sent to the user device to resume playback of the audio asset at the same corresponding location.

In some embodiments, the media guidance application will compare the playback locations of the audio and video assets (e.g., via control circuitry 304 (FIG. 3)) and synchronize the audio asset to the video asset in response. For example, the audio and video assets may become desynchronized if there is excessive latency in communication network 414 (FIG. 4) or if the data stream is temporarily unavailable. After comparing the playback locations, the media guidance application may transmit an instruction to user device 506 (FIG. 5) to alter the playback location of the audio asset and resynchronize the audio and video assets.

In some embodiments the media guidance application may automatically compensate for the delay time between detecting an indicium and a device responding to an instruction. If the media guidance application determines that the multiple sources of content have become desynchronized beyond an acceptable threshold (e.g., via detection module 316 or control circuitry 304 (FIG. 3)), it may transmit instructions to the user device to adjust playback of the audio asset accordingly. For example, if the media guidance application determines that delay between video content and supplemental audio content is currently greater than 50 ms, the media guidance application will adjust playback location of the audio asset to match the playback location of the video asset.

For illustrative purposes the examples given herein focus primarily on embodiments synchronizing video assets and audio assets, but the methods described could easily apply to synchronizing any types of media asset or content. The possible applications include, but are not limited to, synching multiple video assets, multiple visual overlays, multiple audio assets, combinations of video and subtitle text, audio and visual content received in conjunction with live performances, or interactive content combined with any of the aforementioned. For example, the methods described could easily be applied to synchronizing supplemental subtitles delivered to a handheld device with a movie being displayed on a large screen. The methods described could also easily apply to synchronizing a plurality of supplemental content. For example, the methods described could be easily applied to simultaneously delivering supplemental foreign language audio and subtitles to a handheld device and synchronizing that content with a movie being displayed on a larger screen.

The above-described embodiments of the present disclosure are presented for the purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should be noted, the systems and/or methods described above may be applied to, or used in accordance with, other systems and/or methods.

What is claimed is:

1. A method of synching supplemental audio content to video content, the method comprising:
    receiving, from a first device, a user input identifying a video asset;
    comparing, at a second device, data associated with the video asset with a database listing audio files for various video assets to determine an audio asset that corresponds to the video asset;
    transmitting, from the second device, a first portion of the audio asset to the first device;
    receiving, at the second device, a data stream corresponding to playback of the video asset;
    monitoring, at the second device, the data stream for a first indicium, wherein the first indicium indicates the playback of the video asset has ceased at a first playback position of the video asset;
    in response to detecting the first indicium in the data stream, transmitting an instruction to pause playback of the audio asset on the first device;
    monitoring, at the second device, the data stream for a second indicium, wherein the second indicium indicates the playback of the video asset has resumed at a second playback position of the video asset; and
    in response to detecting the second indicium in the data stream:
        determining whether the first portion of the audio asset corresponds to the second playback position of the video asset;
        in response to determining that the first portion of the audio asset does not correspond to the second playback position of the video asset:
        identifying a second portion of the audio asset, wherein a beginning of the second portion of the audio asset corresponds to the second playback position of the video; and
        transmitting, to the first device, the second portion of the audio asset and an instruction to begin playback of the second portion of the audio asset on the first device.

2. The method of claim 1, wherein receiving the user input identifying the video asset includes receiving a title of the video asset.

3. The method of claim 1, wherein receiving the user input identifying the video asset includes receiving a broadcast time of the video asset.

4. The method of claim 1, wherein the audio asset includes alternative language data or commentary data.

5. The method of claim 1, wherein the data stream indicates progress in the playback of the video asset.

6. The method of claim 1, wherein the first indicium indicates that a user has paused the playback of the video asset.

7. The method of claim 1, wherein the first indicium indicates that an advertisement has begun.

8. The method of claim 1, wherein the second indicium indicates that a user has resumed the playback of the video asset.

9. The method of claim 1, wherein the second indicium indicates that an advertisement has ended.

10. The method of claim 1, further comprising comparing a playback location of the audio asset to a playback location of the video asset, and transmitting an instruction to alter the playback location of the audio asset in response.

11. A system for synching supplemental audio content to video content, the system comprising:
    storage circuitry configured to store a database listing audio files for various video assets; and
    control circuitry configured to:
        receive, from a first device, a user input identifying a video asset;
        compare, at a second device, data associated with the video asset with the database listing audio files for various video assets to determine an audio asset that corresponds to the video asset;
        transmit, from the second device, a first portion of the audio asset to the first device;
        receive, at the second device, a data stream corresponding to playback of the video asset;
        monitor, at the second device, the data stream for a first indicium, wherein the first indicium indicates the playback of the video asset has ceased at a first playback position of the video asset;
        in response to detecting the first indicium in the data stream, transmit an instruction to pause playback of the audio asset on the first device;
        monitor, at the second device, the data stream for a second indicium, wherein the second indicium indicates the playback of the video asset has resumed at a second playback position of the video; and in response to detecting the second indicium in the data stream:
  determine whether the first portion of the audio asset corresponds to the second playback position of the video asset; and
  in response to determining that the first portion of the audio asset does not correspond to the second playback position of the video asset:
    identify a second portion of the audio asset, wherein a beginning of the second portion of the audio asset corresponds to the second playback position of the video; and
    transmit, to the first device, the second portion of the audio asset and an instruction to begin playback of the second portion of the audio asset on the first device.

12. The system of claim 11, wherein the control circuitry configured to receive the user input identifying the video asset is further configured to receive a title of the video asset.

13. The system of claim 11, wherein the control circuitry configured to receive the user input identifying the video asset is further configured to receive a broadcast time of the video asset.

14. The system of claim 11, wherein the audio file includes alternative language data or commentary data.

15. The system of claim 11, wherein the data stream indicates progress in the playback of the video asset.

16. The system of claim 11, wherein the first indicium indicates that a user has paused the playback of the video asset.

17. The system of claim 11, wherein the first indicium indicates that an advertisement has begun.

18. The system of claim 11, wherein the second indicium indicates that a user has resumed the playback of the video asset.

19. The system of claim 11, wherein the second indicium indicates that an advertisement has ended.

20. The system of claim 11, wherein the control circuitry is further configured to compare a playback location of the audio asset to a playback location of the video asset, and transmit an instruction to alter the playback location of the audio asset in response.

21. The method of claim 1, further comprising:
  determining a preferred language of a user by monitoring user interactions with at least one of the first device and the second device; and
  determining that the audio asset is in the preferred language of the user,
    wherein the audio asset is transmitted from the second device to the first device based on the determination that the audio asset corresponds to the video asset and the determination that the audio asset is in the preferred language of the user.

22. The system of claim 11, wherein the control circuitry is further configured to:
  determine a preferred language of a user by monitoring user interactions with at least one of the first device and the second device; and
  determine that the audio asset is in the preferred language of the user,
    wherein the audio asset is transmitted from the second device to the first device based on the determination that the audio asset corresponds to the video asset and the determination that the audio asset is in the preferred language of the user.

* * * * *